(12) United States Patent
Meskouris et al.

(10) Patent No.: US 9,198,409 B2
(45) Date of Patent: Dec. 1, 2015

(54) SYSTEMS AND METHODS FOR INSECT EXTERMINATION

(75) Inventors: Chris Meskouris, New York, NY (US); James Meskouris, New York, NY (US)

(73) Assignee: J&C Innovations, LLC, New York, NY (US)

( * ) Notice: Subject to any disclaimer, the term of this patent is extended or adjusted under 35 U.S.C. 154(b) by 477 days.

(21) Appl. No.: 13/546,196

(22) Filed: Jul. 11, 2012

(65) Prior Publication Data

US 2013/0014429 A1    Jan. 17, 2013

Related U.S. Application Data

(60) Provisional application No. 61/507,443, filed on Jul. 13, 2011.

(51) Int. Cl.
*A01M 1/06* (2006.01)
*A01M 1/20* (2006.01)

(52) U.S. Cl.
CPC .............. *A01M 1/2094* (2013.01); *A01M 1/06* (2013.01)

(58) Field of Classification Search
CPC ............................... A01M 1/06; A01M 1/2094
USPC ............... 43/139; 15/344, 250.05, 250.09, 4
See application file for complete search history.

(56) References Cited

U.S. PATENT DOCUMENTS

| | | | | | |
|---|---|---|---|---|---|
| 1,055,620 | A | * | 3/1913 | Edgar | 43/139 |
| 1,527,224 | A | * | 2/1925 | Riordan | 15/257.1 |
| 1,583,975 | A | * | 5/1926 | Hunt | 43/139 |
| 1,807,076 | A | * | 5/1931 | Sweet | 43/139 |
| 1,931,165 | A | * | 10/1933 | Martinet | 15/246.3 |
| 1,938,378 | A | * | 12/1933 | Ell | 15/246.3 |
| 2,114,494 | A | * | 4/1938 | Hummel et al. | 43/132.1 |
| 2,117,419 | A | * | 5/1938 | Hamrick et al. | 43/130 |
| 2,567,616 | A | * | 9/1951 | Moore | 43/139 |
| 2,590,152 | A | * | 3/1952 | McGowan | 15/319 |
| 2,694,879 | A | * | 11/1954 | Stoll | 43/139 |
| 3,001,321 | A | * | 9/1961 | Mauro et al. | 43/139 |
| 3,319,374 | A | * | 5/1967 | Gawne | 43/139 |
| 3,774,262 | A | * | 11/1973 | Anthony et al. | 15/345 |
| 4,052,765 | A | * | 10/1977 | Guhne et al. | 15/344 |
| 4,074,458 | A | * | 2/1978 | Catlett | 43/139 |
| 4,175,352 | A | * | 11/1979 | Catlett | 43/139 |
| 4,279,095 | A | * | 7/1981 | Aasen | 43/139 |

(Continued)

FOREIGN PATENT DOCUMENTS

| DE | 9215088 U1 | * | 1/1993 | A47L 9/02 |
|---|---|---|---|---|
| DE | 102008003394 | * | 1/2009 | A01M 1/06 |

(Continued)

*Primary Examiner* — Darren W Ark
(74) *Attorney, Agent, or Firm* — Michael J. Brown

(57) ABSTRACT

A system, a method, and a device for exterminating insects are provided. The system includes a housing having a heating chamber, a fan disposed inside the housing and coupled to the heating chamber. The heating chamber includes a first heating element, a tube having a proximal end and a distal end. The proximal end of the tube is coupled to the housing. The distal end includes at least one second heating element. Upon activation, the fan creates a suction effect throughout the tube and causes an insect from a surface to be drawn into the distal end. When the insect is drawn into the distal end, the second heating element applies heat to initially exterminate the insect. Then, the insect is drawn in to the heating chamber. The first heating element performs final extermination of the insect and deposits the insect inside the heating chamber.

18 Claims, 8 Drawing Sheets

(56) References Cited

U.S. PATENT DOCUMENTS

| | | | | |
|---|---|---|---|---|
| 4,488,331 A * | 12/1984 | Ward | ............................ | 43/139 |
| 4,594,807 A * | 6/1986 | McQueen | ................... | 43/132.1 |
| 4,630,329 A * | 12/1986 | Shores | ............................ | 43/139 |
| 4,733,495 A * | 3/1988 | Winnicki | ........................ | 43/139 |
| 4,817,330 A * | 4/1989 | Fahringer | ....................... | 43/139 |
| 4,908,978 A * | 3/1990 | Zacharias | ....................... | 43/112 |
| 4,918,857 A * | 4/1990 | Wade et al. | .................... | 43/139 |
| 4,953,320 A * | 9/1990 | Nelson | ........................... | 43/132.1 |
| 5,115,765 A * | 5/1992 | El Omary | ....................... | 43/139 |
| 5,222,322 A * | 6/1993 | Mastromonaco | ............... | 43/139 |
| 5,241,779 A * | 9/1993 | Lee | .................................. | 43/139 |
| 5,305,495 A * | 4/1994 | Nelsen et al. | .................... | 43/139 |
| 5,402,598 A * | 4/1995 | Wade et al. | .................... | 43/139 |
| 5,471,782 A * | 12/1995 | Brittell | ............................ | 43/132.1 |
| 5,481,780 A * | 1/1996 | Daneshvar | ....................... | 15/339 |
| 5,806,238 A * | 9/1998 | Brenner et al. | ................. | 43/139 |
| 5,926,997 A * | 7/1999 | Wilcox | ............................ | 43/139 |
| 6,202,343 B1 * | 3/2001 | Mah | .................................. | 43/139 |
| 6,226,919 B1 * | 5/2001 | Septer | ............................. | 43/139 |
| 6,675,528 B2 * | 1/2004 | Jablin | ............................. | 43/139 |
| 7,198,750 B2 * | 4/2007 | Czajkowski et al. | ........ | 15/246.3 |
| 7,444,711 B2 * | 11/2008 | Garcia et al. | .................... | 15/339 |
| 7,476,885 B2 * | 1/2009 | Garcia et al. | .................... | 15/339 |
| 7,507,980 B2 * | 3/2009 | Garcia et al. | .................... | 15/339 |
| 7,690,148 B2 * | 4/2010 | Hedman | ..................... | 43/132.1 |
| 7,721,383 B2 * | 5/2010 | Garcia et al. | .................... | 15/324 |
| 7,923,707 B2 * | 4/2011 | Garcia et al. | .................... | 15/339 |
| 8,109,036 B1 * | 2/2012 | Wilbanks | ........................ | 43/139 |
| 8,112,841 B2 * | 2/2012 | Garcia et al. | .................... | 15/319 |
| 8,186,004 B2 * | 5/2012 | Garcia et al. | .................... | 15/339 |
| 8,302,248 B2 * | 11/2012 | Chavana et al. | ................. | 15/344 |
| 8,584,314 B2 * | 11/2013 | Lewis | ............................... | 43/139 |
| 8,667,731 B2 * | 3/2014 | Panella et al. | .................... | 43/139 |
| 9,010,017 B2 * | 4/2015 | Southard | ......................... | 43/139 |
| 2006/0179708 A1 * | 8/2006 | Garland | .......................... | 43/139 |
| 2006/0218851 A1 * | 10/2006 | Weiss et al. | ..................... | 43/139 |
| 2007/0074447 A1 * | 4/2007 | Kalogroulis | .................... | 43/139 |
| 2009/0184268 A1 * | 7/2009 | Garcia et al. | .................... | 15/324 |
| 2009/0277074 A1 * | 11/2009 | Noronha | ......................... | 43/113 |
| 2010/0186285 A1 * | 7/2010 | Schmitt | .......................... | 43/139 |
| 2010/0293741 A1 * | 11/2010 | Ferris | .............................. | 15/339 |
| 2012/0137569 A1 * | 6/2012 | Younts | ............................. | 43/139 |
| 2014/0013655 A1 * | 1/2014 | Southard | ......................... | 43/139 |
| 2014/0053364 A1 * | 2/2014 | Vasudeva | ......................... | 15/322 |
| 2015/0040333 A1 * | 2/2015 | Milanese et al. | ........... | 15/104.94 |

FOREIGN PATENT DOCUMENTS

| | | | | |
|---|---|---|---|---|
| FR | 1082201 A | * | 12/1954 | ................ A47L 9/02 |
| GB | 2351645 A | * | 1/2001 | ............. A01M 1/06 |
| GB | 2408909 A | * | 6/2005 | ............. A01M 1/06 |
| JP | 05317218 A | * | 12/1993 | ............. A01M 1/00 |
| JP | 07031349 A | * | 2/1995 | ............. A01M 1/06 |
| JP | 11285340 A | * | 10/1999 | ............. A01M 1/06 |
| JP | 2003169583 A | * | 6/2003 | ............. A01M 1/06 |
| JP | 2004041130 A | * | 2/2004 | ............. A01M 1/06 |
| JP | 2004057076 | | 2/2004 | |
| JP | 2004057076 A | * | 2/2004 | ............. A01M 1/06 |
| JP | 2008263875 A | * | 11/2008 | ............. A01M 1/06 |
| JP | 2010-041976 | | 2/2010 | |
| WO | WO 94/23632 A1 | * | 10/1994 | ................ A47L 9/02 |
| WO | 2009-012948 | | 1/2009 | |

* cited by examiner

SYSTEMS AND METHODS FOR INSECT EXTERMINATION

CROSS-REFERENCE TO RELATED APPLICATIONS

The present application relates to and claims priority U.S. Provisional Patent Application No. 61/507,443 to Meskouris, filed Jul. 13, 2011, and entitled "Systems and Methods for Insect Extermination", and incorporates its disclosure herein by reference in its entirety.

TECHNICAL FIELD

The present application relates to pest and insect control. In particular, the present application relates to systems, devices, and methods for exterminating of unwanted insects by application of heat at various stages of extermination to prevent reappearance of insects.

BACKGROUND

Unwanted insects, such as cockroaches, bedbugs, mites, ticks, termites, flies, carpet beetles, ants, hornets, lice, fleas, wasps, spiders, etc. present a common problem in many structures, including office buildings, commercial buildings, banks, residential buildings, houses, schools, factories, hospitals, stores, malls, indoor entertainment venues, storage facilities, laboratories, vehicles, aircraft, ships, buses, theatres, arenas, education facilities, libraries and/or structures and/or facilities which can be at times occupied by equipment, materials, live occupants (e.g., humans, animals, synthetic organisms, etc.), etc., and/or any combination thereof. There are various causes for occurrence of insect pests, most of which relate to human activity. For example, in many hotels, a problem of bedbugs is caused by humans being carriers of bedbugs and/or their eggs. Once a bedbug is brought into the hotel room, it can reproduce and a significant infestation can occur.

Most insect pests are nothing more than an irritation that typically materializes itself in insect bites. Others may cause allergic reactions and/or various medically-related side-effects. However, some insects may be carriers of infectious and/or even deadly diseases, where a bite of such infected insect may require immediate medical attention and if left untreated can lead to dire consequences.

There are many known ways to attempt to battle insect and/or pest infestations. Some of which include application of chemicals by spraying, fumigating, setting up traps, etc. Others include usage of various materials are serve as insect repellants (e.g., encasing a mattress in a bedbug-resistant cover). Such treatment methods can be applied before and/or after infestation occurs. However, these methods, while being sufficient to treat infestation for a period of time, may lose their effectiveness after a number of applications by virtue of insects adapting to chemicals that may be used in such methods or insects migrating to a location where treatment is not being applied and then returning to the original location after the treatment is no longer being applied. Further, application of chemicals or other treatment methods might not eradicate eggs of some insects, thereby insect infestation can regenerate itself from the remaining eggs even if the adult population of insects is eliminated.

Thus, conventional systems and methods for insect extermination are not sufficient in eliminating insect infestations. As such, there is a need for systems and methods that can substantially exterminate insects and prevent regeneration of insect infestations.

SUMMARY

In some implementations, the current subject matter relates to a system for extermination of insects. The system can include a housing having a heating chamber, wherein the heating chamber includes at least one first heating element, a tube having a proximal end and a distal end, wherein the proximal end of the tube is coupled to the housing, wherein the distal end includes at least one second heating element, a fan disposed inside the housing and coupled to the heating chamber. Upon activation, the fan is configured to create a suction effect throughout the tube and further configured to cause at least one insect from a surface to be drawn into the distal end. Upon the at least one insect being drawn into the distal end, the second heating elements are configured to apply heat thereby initially exterminating the at least one insect. At least one initially exterminated insect is further configured to be drawn in to the heating chamber, wherein the at least one first heating element is configured to perform final extermination of the at least one insect and further configured to deposit the at least one finally exterminated insect inside the heating chamber.

In some implementations, the current subject matter can include the following optional features. The housing further includes a door for removal of the at least one finally exterminated insect from the heating chamber. The housing and the tube are configured to be thermally insulated to prevent loss of heat from the heating chamber and the distal end. The housing can include at least one filter, where the at least one filter is disposed between the proximal end of the tube and the fan and/or after the heating chamber. The at least one filter includes at least one third heating element that is configured to apply heat to the at least one initially exterminated insect at the time the at least one initially exterminated insect reaches the at least one filter from the tube when the at least one filter is disposed between the proximal end of the tube and the fan and/or the at least one filter is configured to apply heat to the at least one finally exterminated insect at the time the at least one finally exterminated insect has been finally exterminated in the heating chamber. At least one initially exterminated insect includes at least one of the following: a live insect and a dead insect. At least one finally exterminated insect is a dead insect. At least one first heating element is configured to heat to the heating chamber to a first predetermined temperature. At least one second heating element is configured to heat the distal end to a second predetermined temperature.

In some implementations, the current subject matter relates to a method for exterminating insects. The method includes providing a device discussed above, then activating the fan and creating a suction inside the tube, using the at least one first heating element, generating heat inside the heating chamber, using the at least one second heating element, generating heat inside the distal end of the tube, using the distal end of the tube, drawing insect into the tube, applying heat to the drawn insects inside the tube to initially exterminate the drawn insects, applying heat to the initially exterminated insects inside the heating chamber to finally exterminate the insects.

BRIEF DESCRIPTION OF THE FIGURES

The current subject matter is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The current subject matter relates to systems and methods for insect extermination and/or eradication.

Figure 1:
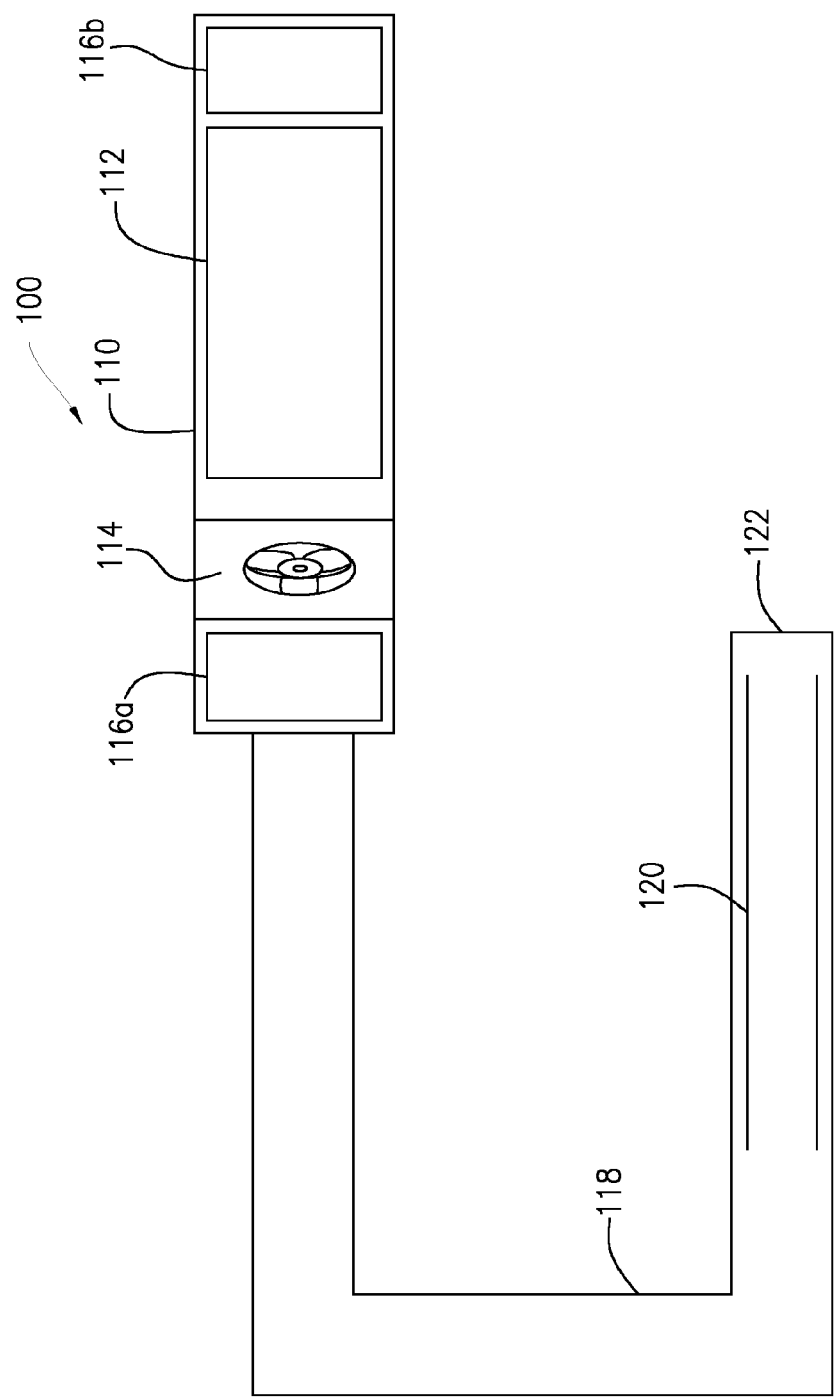
FIG. 1 illustrates an exemplary system for insect extermination, according to some implementations of the current subject matter.

FIG. 1 illustrates an exemplary system 100 for insect extermination, according to some implementations of the current subject matter. The insect extermination system 100 can include a housing 110 having an interior heating chamber 112, a fan 114, and at least one heating filter(s) or screen(s) 116(a, b). The housing 110 can be coupled to a hose or a tube 118 having a receiving end 122. The tube 118 can include heating elements 120 that can be disposed proximately to the receiving end 122. The device can also include various handles that can be attached to the housing 110 and/or tube 118 to assist a user in carrying the device (not shown in FIG. 1). The housing 110 and the tube 118 can be thermally insulated to prevent accidental burns and/or to provide safety to the user and/or surrounding environment. Some examples of the thermal insulation can include a heat wrap, ceramic paint, thermal barrier coating, etc. In some implementations, the insulation can include a heat or a flame retardant material or flame resistant meta-aramid material, such as NOMEX®. In some implementations, the device can be operated from an electrical outlet (110V, 220V, etc.) and/or using batteries. The system 100 can further include an electrical motor (not shown in FIG. 1) that can be configured to operate the heating chamber 112, the fan 114, and the heating filter(s) or screen(s) 116(a, b) as well as the heating elements 120. The motor can be disposed inside the housing 110 can be electrically coupled to each of the heating chamber 112, the fan 114, the heating filter(s) 116(a, b), and the heating elements 120. In some implementations, the system 100 can include separate power sources for each or some of the components 112, 114, 116(a, b), and 120. Further, each power source (or a single power source) can have its own on/off switch (e.g., mechanical, electrical, electro-mechanical, etc.) and can be programmed to turn on and/or off at predetermined times, periodically, automatically. In some implementations, the system 100 can include at least one sensor configured to detect presence of insects and cause the system to turn on for the purposes of extermination.

Figure 2:
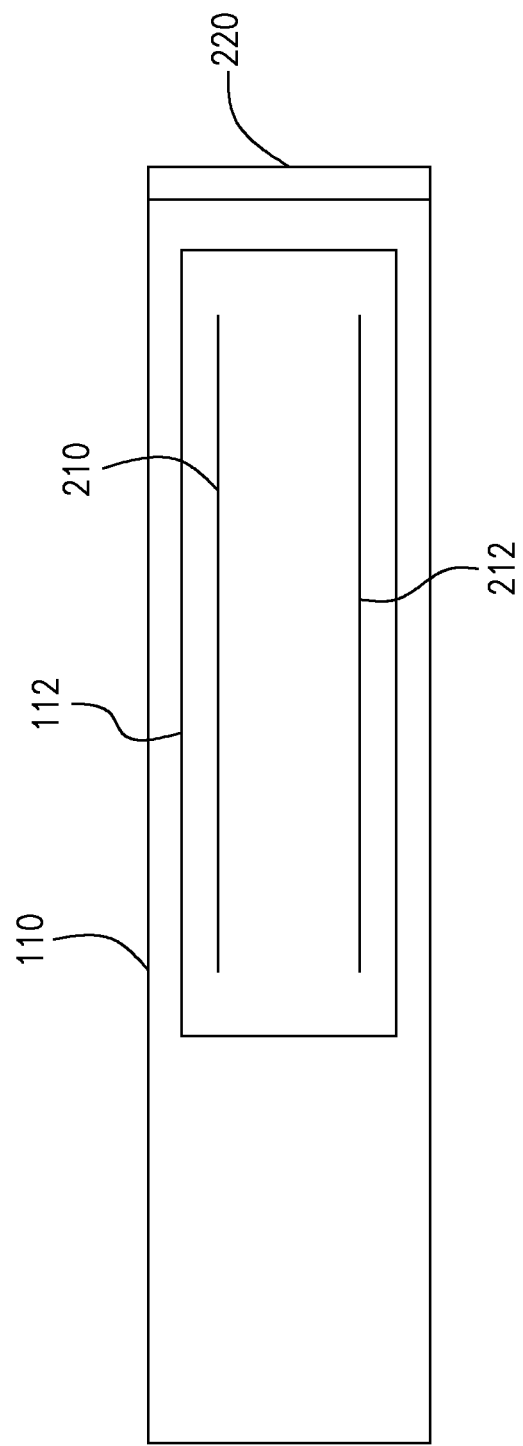
FIG. 2 illustrates a heating chamber of the system shown in FIG. 1, according to some implementations of the current subject matter.

In some implementations, the chamber 112 can include a plurality of heating elements that can be disposed inside the chamber, as shown in FIG. 2. FIG. 2 illustrates a portion of the housing 110 showing the heating chamber 112. The chamber 112 can include heating elements 210 and 212 that can be configured to generate heat upon application of electrical current to them. The elements 210 and 212 can be thermal heating elements, electrical heating elements, chemical heating elements, and/or any other heating elements, and/or any combination thereof. The heating elements can be configured to generate heat inside the chamber 112 to ensure that any insects (live or dead) that have travelled into the chamber 112 from the tube 118 are permanently exterminated. The chamber 112 can be manufactured from any material that can be configured to contain heat (at any temperature) without a substantial loss of the heat to the outside of the chamber. In some implementations, the chamber 112 and/or the housing 110 can further include a door 220 that can be used to empty out insect cadavers after extermination. In some implementations, the chamber 112 can further include a heat sensor (not shown in FIG. 2) that can determine temperature inside the chamber 112 and can be configured to forward a signal to a processing component of the system 100 that the temperature inside the chamber has reached a predetermined temperature required to exterminate insects and that no further increase in temperature is desired. Each such predetermined temperature can be preset according to various guidelines, regulations, temperature required to exterminate a particular insect, and/or any other considerations. The chamber 112 can further include an extermination sensor (not shown in FIG. 2) that can be configured to determine whether all insects accepted into the chamber are exterminated. Such sensor can be a motion detection sensor and/or any other sensor.

Figure 3:
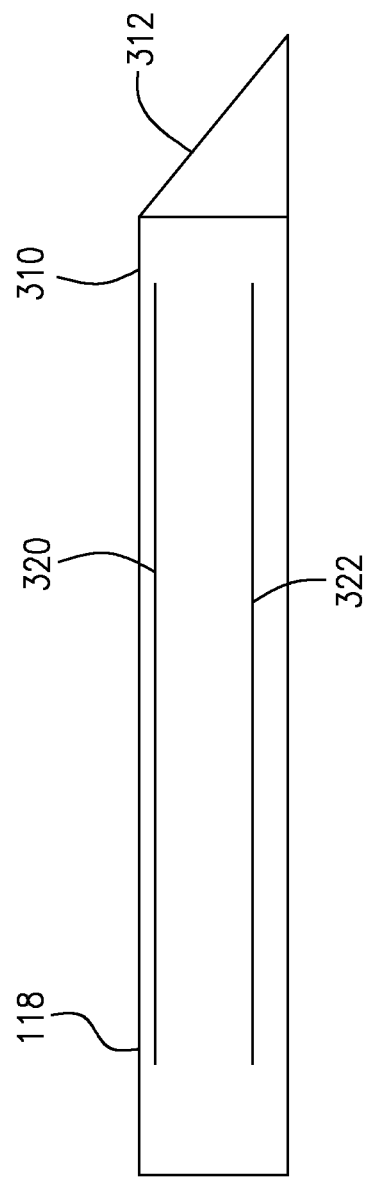
FIG. 3 illustrates a distal end of a tube of the system shown in FIG. 1, according to some implementations of the current subject matter.

The tube 118 includes a proximal end coupled to the housing 110 and a distal end 310 that is disposed away from the housing 110. The distal end 310 is illustrated in FIG. 3. The distal end of the tube 118 can include heating elements 320 and 322 (which are similar to the heating elements 120 shown in FIG. 1) and a nose 312. The nose 312 can be configured to be open to allow intake of insects from surfaces. The heating elements 320, 322 can be configured to be disposed along the length of the distal end 310, as shown in FIG. 3, however, the arrangement and/or the number of heating element is not limited to the one shown in FIG. 3. The heating elements 320, 322 can be thermal heating elements, electrical heating elements, chemical heating elements, bio-chemical heating elements, and/or any other heating elements, and/or any combination thereof. The heating elements 320, 322 can be configured to generate heat inside the distal end 310 to ensure that at least some of the insects (live or dead) that have been taken into by the nose 310 from a surface are exterminated. The distal end 310 and/or the entire tube 118 can be manufactured from any material that can be configured to contain heat (at any temperature) without a substantial loss of the heat to the outside of the distal end 310/tube 118. The tube can be flexible, rigid, and/or have portions that are flexible and/or rigid, and/or have varying flexibility/hardness and/or any combination of the above.

To intake insects from a surface, the housing 110 can include the fan 114 that can be configured to operate to create a suction effect at the nose 312 and throughout the entire tube 118. Such effect can be strong enough to allow suction of air along with any insects that happen to be present in the vicinity of the nose 312. The fan 114 can be configured to operate at a force that that is stronger than insects' motion (flying, crawling, etc.) power, thereby preventing insects from getting away from the nose 312.

Upon being accepted into the distal end 310, the insects can be subject to heat and at least some or most of them will be exterminated by such heat. In some implementations, the distal end 310 can be configured to include an entrapment device (not shown in FIG. 3) that can be configured to prevent insects from escaping from the nose. Similarly to the heating elements in the chamber 112, the heating elements 320, 322 can be configured to operate upon detection of insects inside the distal end 310 or can operate upon detection of the fan 114 becoming operational or upon detection of insects in the vicinity of the nose 312. In some implementations, the heating elements 320, 322 (and/or heating elements 210, 212) can be configured to operate in a pre-heat cycle to allow the heating elements to pre-heat the space into which insects will be accepted to before operating of the fan 114. Such pre-heat cycle can allow insects to be accepted into the spaces of the distal end 310 and the chamber 112 when such spaces have been already heated to a predetermined temperature. This allows for a more efficient operation of the system 100. The fan 114 can be any other device that is capable of creating suction throughout the system 100 (including at the distal end 312 and the tube 118).

In some implementations, as shown in FIG. 1, the filter 116a can be coupled between the fan 114 and the tube 118. Once initial extermination of the insects occurs at the distal end 310, the insects (live or dead) travel through the tube 118 through the filter 116a and into the chamber 112. The filter 116a can be configured to apply further heating through use of heating elements that are similar to the heating elements 210, 212, 320, 322, shown in FIGS. 2-3. The filters 116a can be pre-heated in a similar fashion to ensure efficient extermination of the insects. Upon reaching the filter 116a, any live insects are now exterminated by application of heat and their cadavers are deposited into the chamber 112. In some implementations, as shown in FIG. 1, the filter 116b can be disposed after the heating chamber 112. The filter 116b can be similarly pre-heated to ensure efficient extermination of insects that have been finally exterminated in the heating chamber. The filter 116b can be configured to prevent escape of any insects that may have potentially survived extermination in the tube 118 and/or heating chamber 112. As can be understood by one having ordinary skill in the art, the system 100 can include none and/or one or more of filters 116, whether such filters are disposed between the tube 118 and the fan 114, between the fan 114 and the heating chamber 112, after the heating chamber 112, at the exit door of the housing 110, and/or at any other desired location. The filters 116 can apply heat, apply chemically treatments, apply bio-chemical treatment, be environmentally safe, and/or have any other features, and/or any combination of features.

In some implementations, the operation of the fan 114, the filter(s) 116(a, b) and the heating elements inside the chamber 112 and the distal end 310 can be based upon detection of presence of insects on an external surface (e.g., mattresses, walls, furniture, carpets, chairs, kitchen/office cabinets, etc.), inside the distal end 310, inside the tube 118, at the filter(s) 116(s), inside the chamber 112, etc. Such detection can be accomplished through use of sensors and/or a network of sensors that can be disposed through the system (e.g., at the nose 312, inside the distal end 310, inside the tube 118, at the filter(s) 116(a, b), inside the chamber 112, etc.). Alternatively, a user of the system 110 can manually activate the system 100 and/or any of its respective heating elements upon visually detecting presence of insects for extermination. In some implementations, the filter(s) 116(a, b) can be configured to prevent exterminated insects from travelling back toward the distal end 310 and/or otherwise escaping the system 100 alive and/or dead.

To use the device, the user can activate the fan 114 and/or any of its heating elements (in some implementations, the heating elements can be activated during a pre-heat cycle and/or before operation of the fan 114) and bring the receiving end 122 of the tube 118 into a close proximity to insects that are to be exterminated. The fan 114 can create a suction effect and draw the insects into the receiving end 122, where at least some or all of them are heat-killed or exterminated using heating elements 120. The remainder of the insects and those that have been killed travel through the tube 118 toward heating filter 116a (if one is installed in the system), which has been pre-heated to ensure that all insects drawn into the tube 118 are eliminated. To make sure that all drawn-in insects are completely eliminated, any insects that are still alive and those that have been killed at this point are transferred into the heating chamber 112, where final extermination takes place through application of heat inside the chamber 112. Heat can be applied using various heating elements. After completion of extermination of insects, the chamber 112 can be removed and insect cadavers can be disposed. The device has a back-flow prevention mechanism that prevents any insects from falling out of the tube 118. The insects that have been finally exterminated in the chamber 112, can also be filtered and/or exterminated using a filter 116b (if one is installed in the system).

The system 100 can be configured to be a portable system (e.g., a countertop system) and/or scaled according size requirements of particular users (such as for example, to treat large facilities, e.g., warehouses, industrial plants, commercial buildings, barns, farm fields, offices and office buildings, factories, etc.). It can also include wheels or any other motion systems that can be coupled to the housing 110 and/or the tube 118 to ease transportation and movement. In some implementations, the housing and/or the tube 118 and/or the distal end 310 can include handles that allow the user to carry the system 100 from place to place. In some implementations, the system 100 can be hermetically-sealed at appropriate locations to prevent escape and/or loss of any insects (live or dead) from the system. The tube 118 can include at least one flexible portion and/or at least one rigid portion, as discussed below.

In some exemplary and non-limiting implementations, the system 100 can be configured to include a tube that has a diameter of approximately 1.5 inches and a length of approximately four feet long. The tube can be wrapped with electrical elements that can heat up to 700 degrees Fahrenheit or greater. To insulate the tube from burning the user or other objects, the tube can be wrapped in a heat-resistant material, such as NOMEX® felt that can be configured to contain the heat the tube produces during operation. The tube can be further wrapped with braided stainless steel wrapping that can prevent burning the user and/or other external objects during operation. In some implementations, the system can include a control box that can be configured to connect various elements of the system and allow the user to control an amount of heat in the tube and the heating chamber. The control box can include a processor, a memory, a plurality of control buttons (e.g., "on/off" button, operation selection buttons, heat adjusting buttons, and/or any other buttons), a display, and/or any other components that can be configured to assist the user during operation of the system 100. In some implementations, the heating chamber and any other elements of the system 100 that produce heat can be insulated in a similar fashion as the tube as well as have various desired dimensions. The system 100 can be constructed for personal, home-use, industrial/commercial-use and/or any other applications and can have dimensions that are appropriate for each application.

Figure 4:
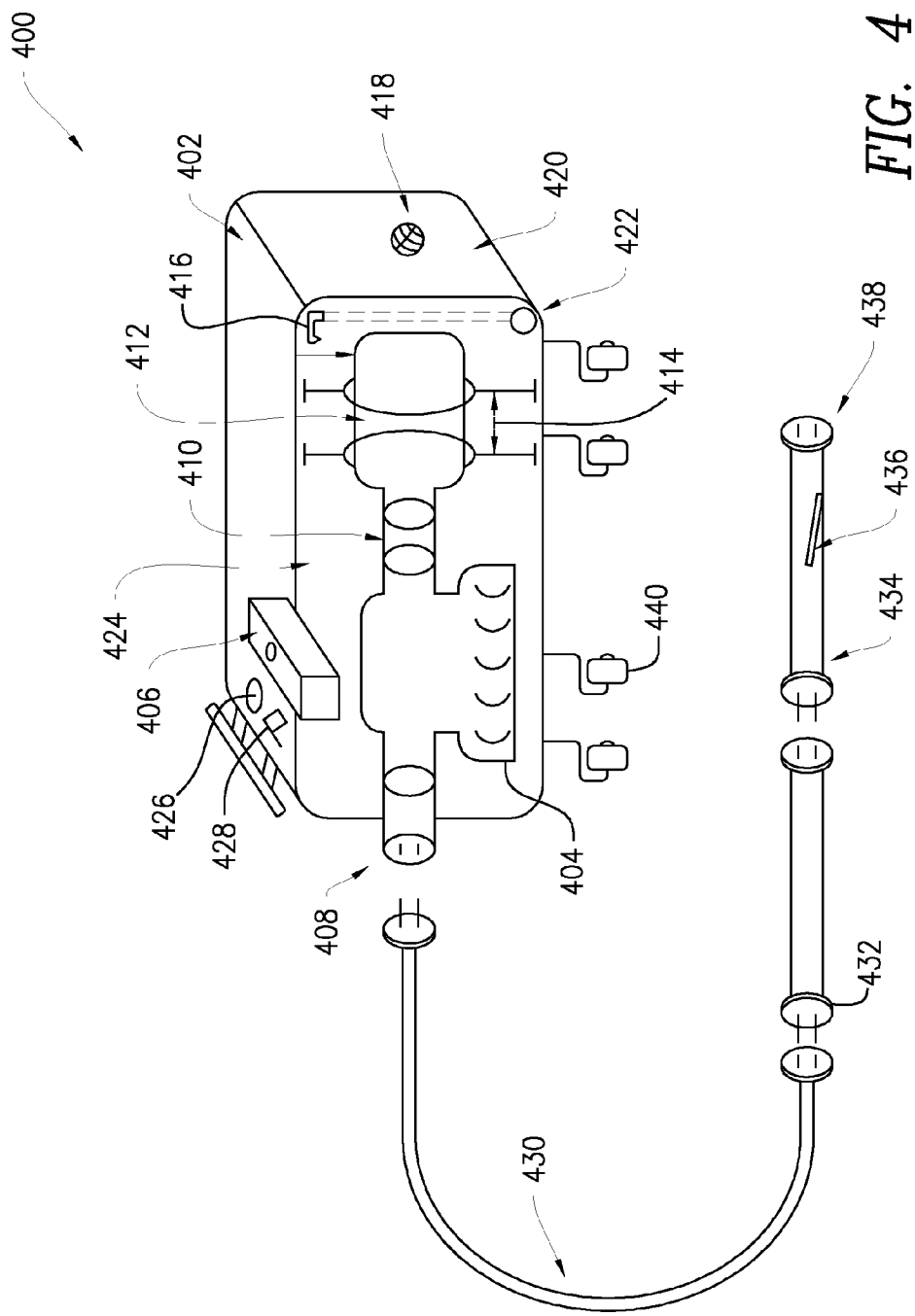
FIG. 4 illustrates an exemplary system for insect extermination, according to some implementations of the current subject matter.

FIG. 4 illustrates an exemplary system 400 for insect extermination, according to some implementations of the current subject matter. The insect extermination system 400 can include a housing 402, a heat-resistant fan motor 404, a system controller 406, a heating chamber 412, a flexible hose 430, and pipes 432 and 434. The device can include an on/off switch 428 that can power on and power off the system 400. The switch 428 can be disposed at the top of the housing 402 and can be electrically coupled to the controller 406 as well as other electric/electronic components of the system 400. The system 400 can include a power supply 426, which can be an internal power supply or an external power supply. The internal power supply can be a battery, an internal power generator, and/or any other power supply source. The external power supply can be a 110 volt and/or 220 volt outlet (and/or any other voltage value outlet) to which the system 400 can be connected via an electrical wire and a plug. For convenience purposes, the wire (not shown in FIG. 4) can be hidden inside the housing 402 in a rolled arrangement and a user of the system 400 can pull the wire out of the housing when the system 400 is in use (the wire can be spring-released so that when the system 400 is not in use, the wire can automatically be retracted into the housing 402).

The fan motor 404 can be thermally coupled to the heating chamber 412 via a thermal connection 410. The thermal connection 410 can be a pipe that is appropriately insulated with a heat resistant and/or melt resistant material. The fan motor 404 and the heating chamber 412 can be secured within the housing using screws, bolts, hooks, VELCRO®, brackets (as shown in FIG. 4 as brackets 414), or they can be welded, glued, threaded on (e.g., in a twist-on/off, screw-on/off, etc. fashion) and/or attached/coupled to the housing in any other fashion. The fan motor 404 and the heating chamber 412 can also be removably coupled to the housing 402 as well as to one another. This allows for removal, cleaning, maintenance, repair, etc. of the system 400. In some implementations, the housing 400 can have a door 420 that can be hingedly coupled to the housing 400 using a hinge 422 and a locking mechanism 416. The locking mechanism 416 can allow the door 420 to be kept in a locked and closed position during operation of the system 400. The locking mechanism 416 can be unlocked to open the door 420 and allow access to the interior of the housing 402. Such access can allow the user to open the heating chamber 412 to remove exterminated insects from the heating chamber 412. The door 420 can also include a hot air exhaust opening 418 that can include a wire-meshed cover to allow exhaust of hot air from the heating chamber 412 (the heating chamber 412 can include a similar wire-meshed opening, as shown in FIG. 4) during operation of the system 400 but prevent escape of exterminated insects that have accumulated in the heating chamber 412. The exhaust of hot air can prevent the system 400 from overheating during its operation. The wire-meshed opening can include fine stainless steel wiring that is closely spaced to prevent escape of small objects (e.g., exterminated insects). The wire-meshed opening can be removed from the door 420 for maintenance, cleaning, repair, etc. as necessary.

Figure 5:
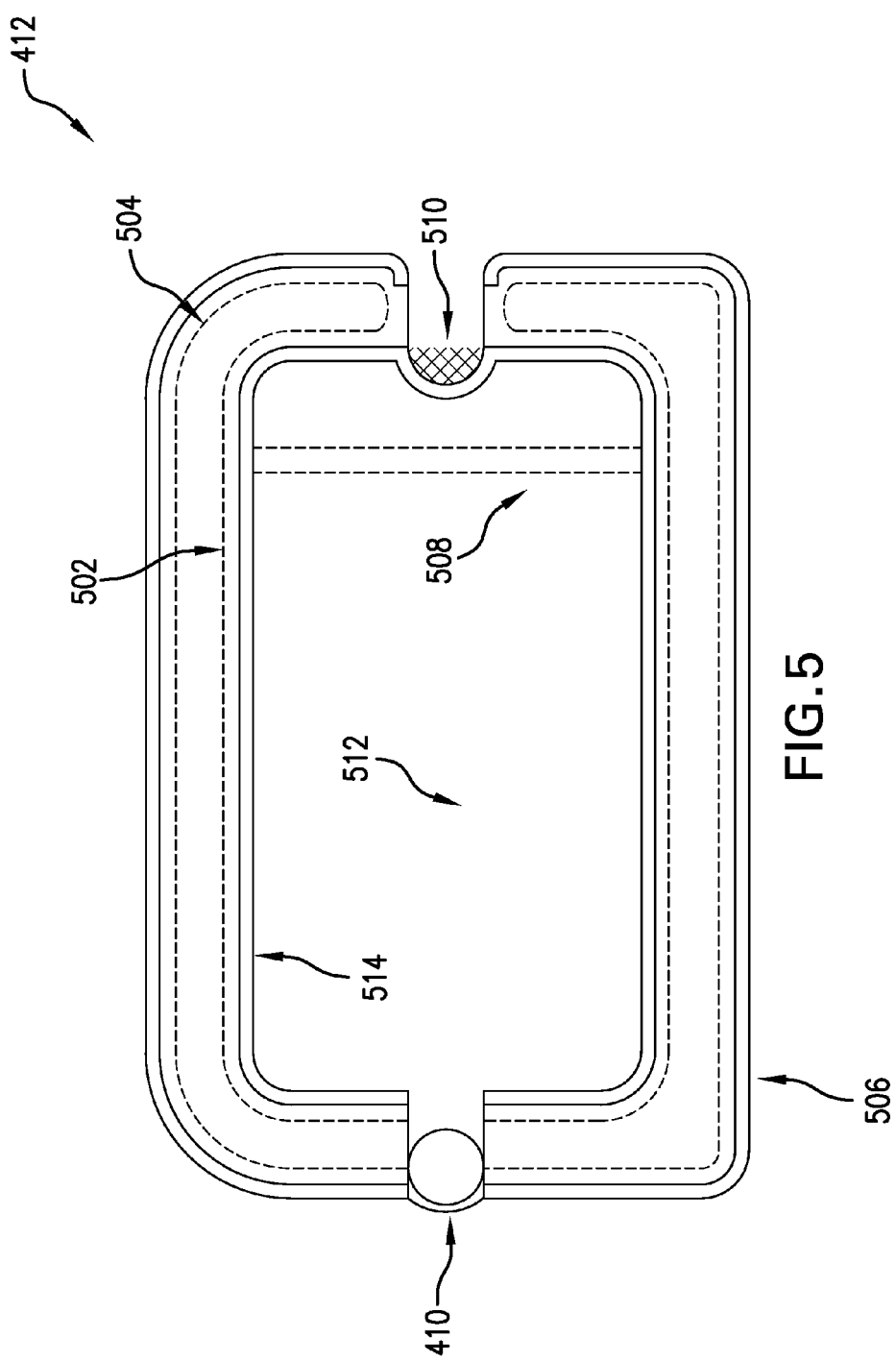
FIG. 5 illustrates an exemplary heating chamber of the system shown in FIG. 4, according to some implementations of the current subject matter.

FIG. 5 illustrates an exemplary heating chamber 412, according to some implementations of the current subject matter. The heating chamber 412 includes an interior 512 that is surrounded by a wall 514. The wall 514 can be manufactured from metal(s), composite material(s), as well as any other materials and/or combination of materials that can be heat-resistant. The wall 514 can have any desired thickness that can be designed to withstand the heat that is being generated inside the heating chamber 412. The chamber 412 can also include at least one heating element 502, a heat resistant material 504, a protective cover 506, a door 508, and a screen 510. The heating element 502 can be wrapped around at least a portion (or the entire wall) of the wall 514 and can provide heat to the interior 512. The heating element 502 can be electrically coupled to the controller 406 and/or the power source of the system 400, where the controller can control an amount of electric power that is being supplied to the heating element 502, which in turn can control the temperature of the heat that is being generated inside the chamber 412. In some implementations, the chamber can also include a temperature sensor that can be disposed in the interior 512 of the chamber 412 (or in any other location) to measure the temperature inside the interior 512 and to provide that information to the controller 406 (not shown in FIG. 5), so that the controller can appropriately control supply of electricity to the electrical heating element 502, thereby controlling the temperature in the interior 512. The controller 406 can control temperature automatically, manually, and/or semi-automatically, such as based upon inputs from the user of the system 400. In some implementations, the user can input a particular operating program that can cause the system 400 to generate a predetermined amount of heat during a predetermined amount of time and when the temperature measured by the temperature sensor inside the chamber 412 reaches a predetermined threshold (e.g., 225 degrees Fahrenheit and/or any other temperature threshold value). The controller 406 can control supply of electricity to the electrical element 502, where an increase in supplied voltage to the electrical element 502 can cause the electrical element 502 to produce additional heat, thereby increasing the heat inside the chamber 412, and a reduction in supplied voltage to the electrical element 502 can cause the element 502 to reduce an amount heat that it generates, thereby reducing the heat inside the chamber 412.

The heat resistant material 504 can be wrapped around the electrical element 502 and/or the entire chamber wall 514. The material 504 can be any heat absorbing or heat reducing material (e.g., NOMEX® felt, described above) that can substantially reduce the amount of heat that can escape from the chamber 412. The material 504 can also safeguard the other components (whether mechanical or electronic) of the system 400 from being overheated by the heat produced by the chamber 412 during operation.

The chamber 412 can also have a protective cover 506 that can protect the chamber from damage and/or any other external elements. The protective cover 506 can be manufactured from metal, composite material, and/or any other desired material that can be suitable for this purposes.

As stated above, the chamber includes an exhaust screen 510 (similar to the screen 418) described above that can allow escape of heat from the interior 512. The screen 510 can be made from stainless steel (or any other suitable material) that can allow exhaust of heat, but prevent escaping of the insects that have been exterminated by heat inside the chamber 412.

The interior 512 of the chamber 412 can be accessed through the door 508 that can be hingedly and hermetically coupled to the wall 514. Such access can allow maintenance, clean-up, removal of exterminated insects, repair, etc. of the chamber.

Referring back to FIG. 4, the fan motor 404 can also include a heat connector 408 that can protrude out of the housing 400 for connection with the hose 430. The connector 408 can be a male/female type connector that can mate with a male/female type connection on the flexible hose 430. As can be understood by one skilled in the art, the connection between the connector 408 and the hose 430 can be any type of connection that can allow for thermally and substantially hermetically secure connection. The connector 408 can be also wrapped in a thermal protective cover to prevent the user (and/or any other objects touching the connector) from being burnt. The hose 430 can be coupled to the pipe 432, which in turn can be coupled to the pipe 434. The pipe 434 can include a collection tip 438 and at least one back flap 436 disposed inside the pipe 434 that can prevent any insects that are sucked into the pipe 434 from exiting from the pipe. Similar to the discussion of FIGS. 1-3 above, the intake (or suction) of insects into the pipe 434 occurs when the fan motor 404 begins to rotate, thereby generating a backflow (or suction) at the tip 438 and throughout the pipes 432, 434 and the hose 430. The fan motor 404 can be controlled by the controller 406 and can rotate with enough rotational force to create sufficient suction throughout the system 400 to allow the insects to be sucked in at the tip 438, travel through the pipes 432, 434, the hose 430, through the fan motor 404, and into the chamber 412. The pipes 432, 434 and the hose 438 can connected using thermal and/or substantially hermetic connection (e.g., male-female type connections, snap-ons, locks, and/or any other locking mechanism). Such connections can prevent heat and insects from escaping at the connection points.

Figure 6:
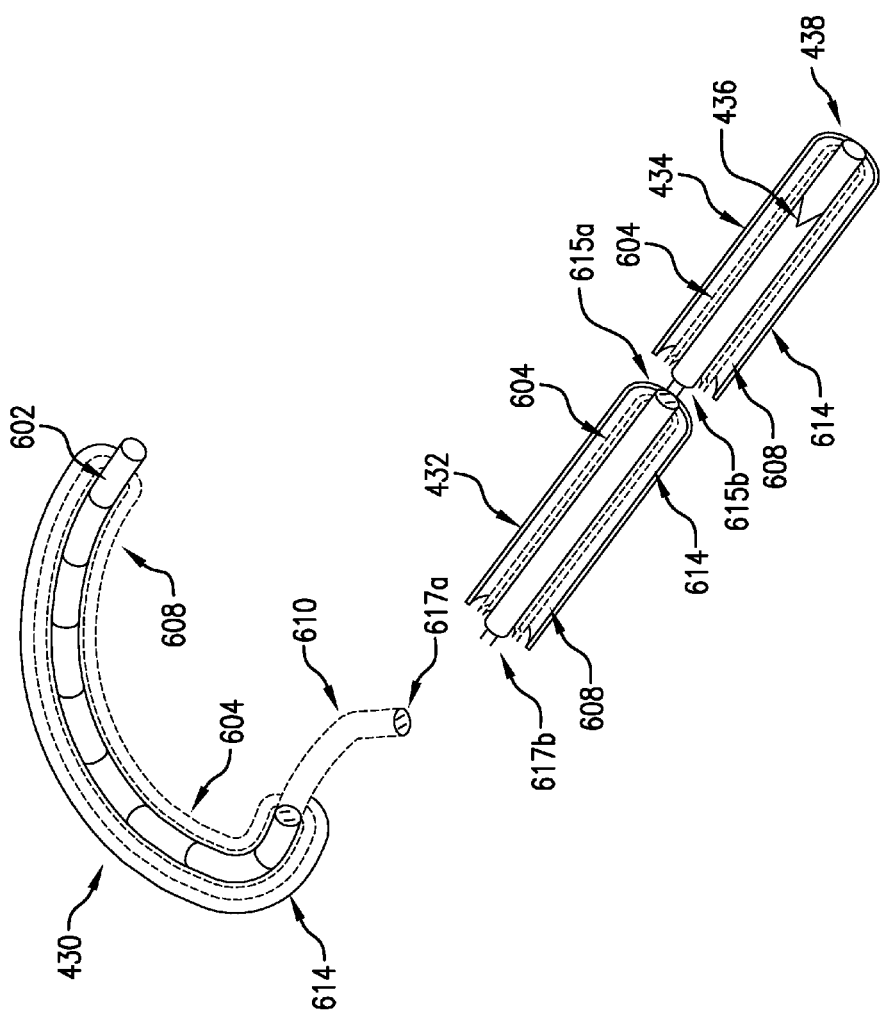
FIG. 6 illustrates an exemplary flexible hose and pipes of the system shown in FIG. 4, according to some implementations of the current subject matter.

FIG. 6 illustrates additional details of exemplary hose 430 and pipes 432, 434, according to some implementations of the current subject matter. In some implementations, the hose 430 can be a flexible metal hose (or manufactured from any other material(s)) that can be coupled/connected at one end to the fan motor 404 at the outlet 408 (shown in FIG. 4) and at the other end have an attachment mechanism 610 that can be coupled/connected to the pipe 432. The connection can be male/female type connection using connectors 617a and 617b, as shown in FIG. 6. The attachment mechanism 610 can be rigid, flexible, semi-rigid, semi-flexible connection and, in some implementations, can have a bent (e.g., a 45 degree bent) that can allow the user to easily use the hose 430 during operation. In some exemplary implementations of the system 400, the hose can have a diameter greater than approximately 0.5 inches (e.g., 1.5 inches, 2 inches, 3 inches, 5 inches, 10 inches, etc. or any desired diameter). The hose can have any length desired.

The pipes 432, 434 can be manufactured from any material, such as metal, composite materials, etc. In some exemplary implementations of system 400, the pipes can have a diameter greater than approximately 0.5 inches (e.g., 1.5 inches, 2 inches, 3 inches, 5 inches, 10 inches, etc. or any desired diameter). The pipes can be any length (e.g., 10 inches, 20 inches, etc.). In some implementations, the pipes 432, 434 can be a single pipe that can be coupled to the hose. In some implementations, the pipes 432, 434 are not necessarily used, in which case, the hose 430 can be used to directly collect insects. In some implementations, the pipes 432, 434 can be rigid, flexible, semi-rigid, and/or semi-flexible.

The pipe 434 can also include a collection tip 438 (such collection tip can be disposed on the pipe 432 and/or hose 430) that allows the user to collect insects when the system 400 is operating and back flaps 436 that prevent escape of collected insects out of the tip 438.

The hose 430 and the pipes 432, 434 can include respective interiors that are surrounded by respective walls. The walls can be manufactured from metal(s), composite material(s), as well as any other materials and/or combination of materials that can be heat-resistant. The walls can have any desired thickness that can be designed to withstand the heat that is being generated inside the hose 430 and/or the pipes 432, 434. The hose 430 and/or the pipes 432, 434 can also include at least one heating element 604, at least one heat resistant material 608, at least one protective cover 614, as shown in FIG. 6. The heating element(s) 604 can be wrapped around at least a portion (or the entire walls) of the respective walls of the hose 430 and/or the pipes 432, 434 and can provide heat to the respective interiors of the hose 430 and/or the pipes 432, 434. The heating element(s) can be electrically coupled to the controller 406 (shown in FIG. 4) and/or the power source of the system 400, where the controller can control an amount of electric power that is being supplied to the heating element(s) 604, which in turn can control the temperature of the heat that is being generated inside the hose 430 and/or the pipes 432, 434. In some implementations, the hose 430 and/or the pipes 432, 434 can also include at least one temperature sensor that can be disposed in the interiors of the hose 430 and/or the pipes 432, 434 (or in any other location) to measure the temperature inside the hose 430 and/or the pipes 432, 434 and to provide that information to the controller 406 (not shown in FIG. 6), so that the controller can appropriately control supply of electricity to the electrical heating element(s) 604, thereby controlling the temperature in the interiors of the hose 430 and/or the pipes 432, 434. The controller 406 can control temperature automatically, manually, and/or semi-automatically, such as based upon inputs from the user of the system 400. In some implementations, the user can input a particular operating program that can cause the system 400 to generate a predetermined amount of heat during a predetermined amount of time and when the temperature measured by the temperature sensor inside the hose 430 and/or the pipes 432, 434 reaches a predetermined threshold (e.g., 225 degrees Fahrenheit and/or any other temperature threshold value). The controller 406 can control supply of electricity to the electrical element(s) 604, where an increase in supplied voltage to the electrical element(s) 604 can cause the electrical element(s) 604 to produce additional heat, thereby increasing the heat inside the hose 430 and/or the pipes 432, 434, and a reduction in supplied voltage to the electrical element(s) 604 can cause the element(s) 604 to reduce an amount heat that it generates, thereby reducing the heat inside the hose 430 and/or the pipes 432, 434.

The heat resistant material 608 can be wrapped around the electrical element(s) 604 and/or the entire walls of the hose 430 and/or the pipes 432, 434. The material 608 can be any heat absorbing or heat reducing material (e.g., NOMEX® felt, described above) that can substantially reduce the amount of heat that can escape from the hose 430 and/or the pipes 432, 434. The material 608 can also safeguard the other components (whether mechanical or electronic) of the system 400 from being overheated by the heat produced by the hose 430 and/or the pipes 432, 434 during operation. It can also safeguard the user and/or exterior objects from burning.

The hose 430 and/or the pipes 432, 434 can also have a protective cover 614 that can protect the chamber from damage and/or any other external elements. The protective cover 614 can be manufactured from metal, composite material, and/or any other desired material that can be suitable for these purposes.

The hose 430 and/or the pipes 432, 434 can be also configured to be coupled to at least one attachment, such as brushes, pipes, etc. of varying sizes (for use on floors, walls, draperies, mattresses, beds, bathrooms, exterior and/or interior surfaces of buildings, open air locations (e.g., backyards, fences, driveways, etc.), switchboxes, electrical outlets, lighting fixtures, and/or for any other use).

In some implementations, the system 400 can also include at least one filter (not shown in FIG. 4), which can be similar to the filter(s) 116(a, b) discussed above with regard to FIG. 1. The filter(s) can be disposed anywhere in the system 400 and can be configured to add extermination capabilities to the system 400 by treating initially exterminated insects, finally exterminated insects, and/or any other insects (live or dead) that enter the system 400.

Figure 7:
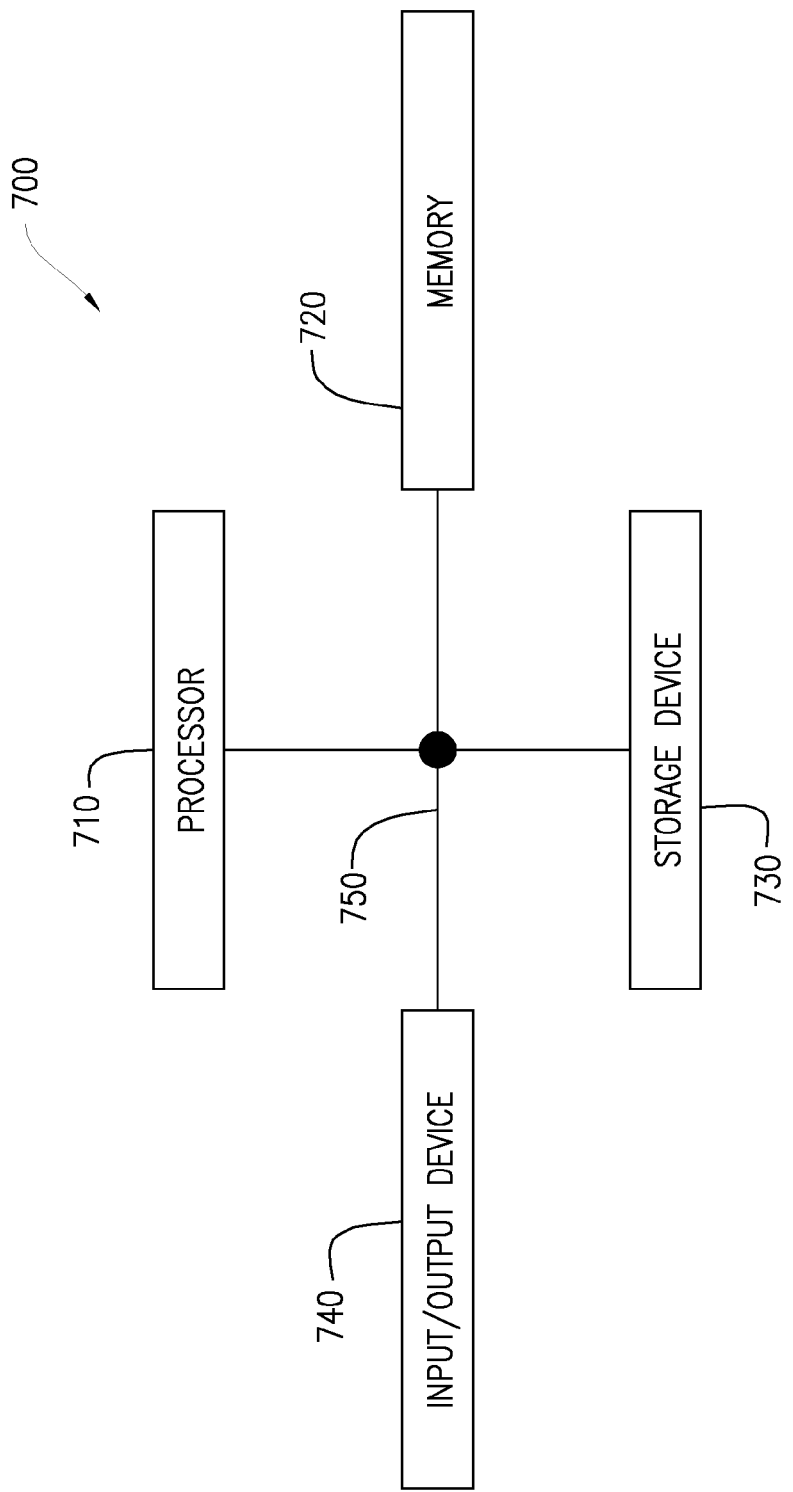
FIG. 7 an exemplary system that can be implemented in a controller of the system shown in FIG. 4, according to some implementations of the current subject matter.

Referring back to FIG. 4, in some implementations, the controller 406 can control operation of the system 400 by controlling supply of heat to the chamber 412, the hose 430, and the pipes 432, 434, as well as by controlling the speed of the fan motor 404. The controller can also include various modes of operation that can be dependent on the user instructions, type of insects that are being exterminated (e.g., some insects may require higher temperature and longer heating to be exterminated). The controller 406 can include a processing system 700, such as the one shown in FIG. 7.

The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces. In some implementations, the controller 406 can be configured receive instructions from a remote control unit (e.g., a cellular telephone, a personal digital assistant, an iPhone, an iPad, an iPod, a personal computer, a telephone, a television remote control unit, and/or any other remote control unit) that can communicate with the controller via a wireless communication (e.g., a wireless communication network), a wired communication, a wireline communication, and/or any other communication.

Referring back to FIG. 4, the system 400 can also include a plurality of electrical connections that can provide electrical and/or electronic communication between various components of the system 400. As can be understood by one having ordinary skill in the relevant art, the electrical/electronic connection can be any connections that can allow for appropriate operation of the system 400 in the process of insect collection and/or extermination.

Figure 8:
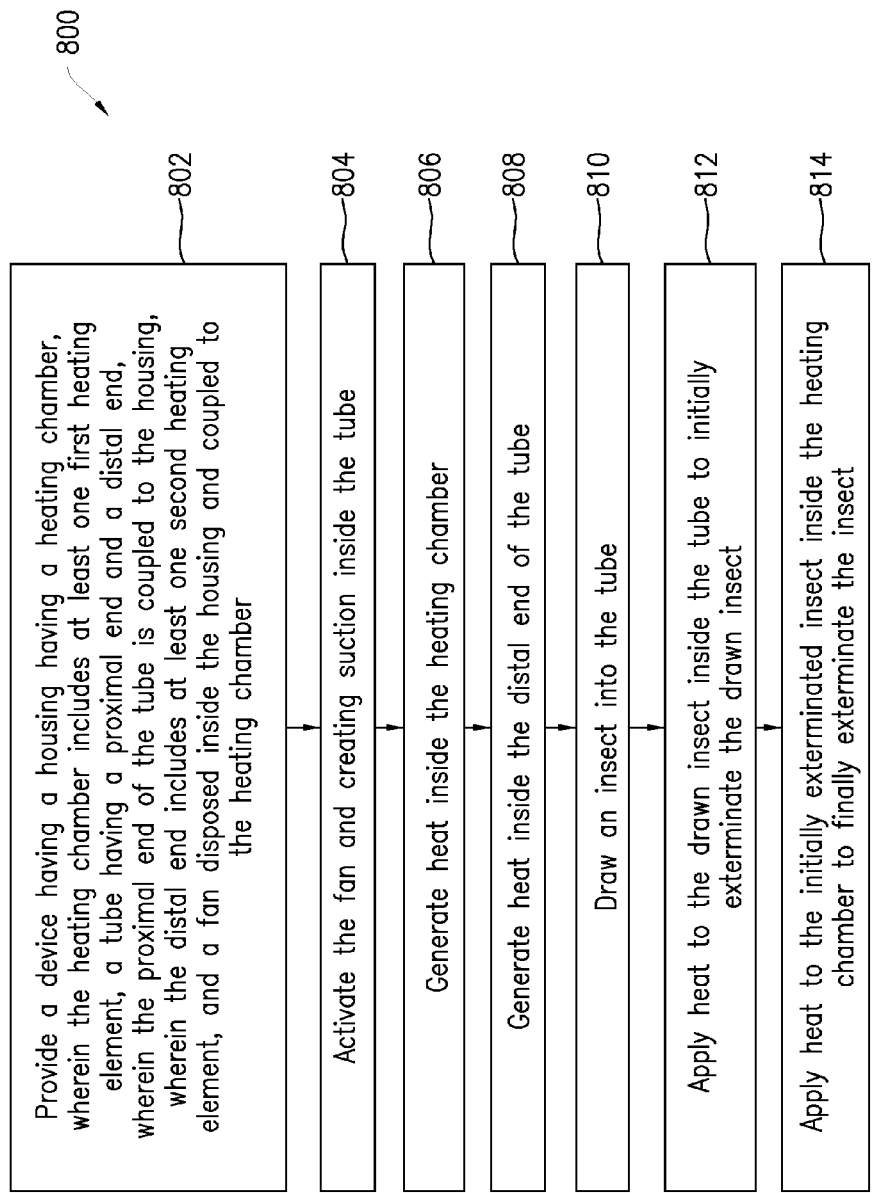
FIG. 8 illustrates an exemplary method for exterminating insects, according to some implementations of the current subject matter.

FIG. 8 illustrates an exemplary method 800 of operating the system 400, according to some implementations of the current subject matter. At 802, a device (such as a device 400) can be provided having a housing having a heating chamber, wherein the heating chamber includes at least one first heating element, a tube having a proximal end and a distal end, wherein the proximal end of the tube is coupled to the housing, wherein the distal end includes at least one second heating element, and a fan disposed inside the housing coupled to the heating chamber. The tube can include at least one of the hose 430, and/or the pipes 432, 434, as shown in FIG. 4. At 804, the fan can be activated to create suction inside the tube. At 806, using at least one first heating element, the heat inside the heating chamber can be generated. At 808, using at least one second heating element, the heat inside the distal end of the tube can be generated. At 810, using the distal end of the tube, an insect can be drawn into the tube. At 812, the heat can be applied to the drawn insect inside the tube to initially exterminate the drawn insect. At 814, the heat can be applied to the initially exterminated insect inside the heating chamber to finally exterminate the insect.

In some implementations, the system for extermination of insects can include a housing having a heating chamber, wherein the heating chamber includes at least one first heating element, a tube having a proximal end and a distal end, wherein the proximal end of the tube is coupled to the housing, wherein the distal end includes at least one second heating element, and a fan disposed inside the housing and coupled to the heating chamber. Upon activation, the fan can create a suction effect throughout the tube and can to cause at least one insect from a surface to be drawn into the distal end. Upon the at least one insect being drawn into the distal end, the second heating element can apply heat thereby initially exterminating the at least one insect. At least one initially exterminated insect can be drawn in to the heating chamber. At least one first heating element can perform final extermination of the at least one insect and can deposit the at least one finally exterminated insect inside the heating chamber.

In some implementations, the current subject matter's system can include one or more of the following optional features. The housing can include a door for removal of the at least one finally exterminated insect from the heating chamber. The housing and the tube can be thermally insulated to prevent loss of heat from the heating chamber and the distal end. The housing can include at least one filter, wherein the at least one filter is disposed between the proximal end of the tube and the fan and/or after the heating chamber. The at least one filter can include at least one third heating element that is configured to apply heat to the at least one initially exterminated insect at the time the at least one initially exterminated insect reaches the at least one filter from the tube when the at least one filter is disposed between the proximal end of the tube and the fan and/or the at least one filter is configured to apply heat to the at least one finally exterminated insect at the time the at least one finally exterminated insect has been finally exterminated in the heating chamber.

At least one initially exterminated insect includes at least one of the following: a live insect and a dead insect. At least one finally exterminated insect is a dead insect. At least one first heating element can heat to the heating chamber to a first predetermined temperature. At least one second heating element can heat the distal end to a second predetermined temperature.

Example implementations of the methods and components of the current subject matter have been described herein. As noted elsewhere, these example implementations have been described for illustrative purposes only, and are not limiting. Other implementations are possible and are covered by the invention. Such implementations will be apparent to persons skilled in the relevant art(s) based on the teachings contained herein. Thus, the breadth and scope of the current subject matter should not be limited by any of the above-described exemplary implementations, but should be defined only in accordance with the following claims and their equivalents.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

The system discussed herein can implement use of one or more computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system for extermination of insects, comprising:
a housing having a heating chamber, wherein the heating chamber includes at least one first heating element configured to apply heat at a temperature capable of exterminating an insect;
a tube having a proximal end and a distal free end, wherein the proximal end of the tube is coupled to the housing, wherein the distal free end is disposed away from the housing and wherein the distal free end includes at least one second heating element that is elongated and extends inside the tube away from the distal free end, the at least one second heating element configured to apply heat at a temperature capable of exterminating an insect;
a fan disposed inside the housing and coupled to the heating chamber;
wherein
upon activation, the fan is configured to create a suction effect throughout the tube and through the at least one second heating element contained therein and further configured to cause at least one insect from a surface to be drawn into the distal free end;
upon the at least one insect being drawn into the distal free end, the at least one second heating element is configured to apply heat thereby initially exterminating the at least one insect; and the at least one initially exterminated insect is further drawn in to the heating chamber, wherein the at least one first heating element is configured to perform final extermination of the at least one insect and further configured to deposit the at least one finally exterminated insect inside the heating chamber.

2. The system according to claim 1, wherein the housing further includes a door for removal of the at least one finally exterminated insect from the heating chamber.

3. The system according to claim 1, wherein the housing and the tube are configured to be thermally insulated to prevent loss of heat from the heating chamber and the distal free end.

4. The system according to claim 1, wherein the housing further comprises at least one filter, wherein the at least one filter further comprises a second filter which is disposed between the proximal end of the tube and the fan and/or after the heating chamber.

5. The system according to claim 4, wherein the at least one filter includes at least one third heating element that is configured to apply heat to the at least one initially exterminated insect at the time the at least one initially exterminated insect reaches the at least one filter from the tube when the at least one filter is disposed between the proximal end of the tube and the fan and the at least one filter is configured to apply heat to the at least one finally exterminated insect at the time the at least one finally exterminated insect has been finally exterminated in the heating chamber.

6. The system according to claim 1, wherein the at least one initially exterminated insect includes at least one of the following: a live insect and a dead insect.

7. The system according to claim 6, wherein the at least one finally exterminated insect is a dead insect.

8. The system according to claim 1, wherein the at least one first heating element is configured to heat the heating chamber to a first predetermined temperature.

9. The system according to claim 1, wherein the at least one second heating element is configured to heat the distal free end to a second predetermined temperature.

10. A method for exterminating insects, comprising:
providing a device having:
   a housing having a heating chamber, wherein the heating chamber includes at least one first heating element configured to apply heat at a temperature capable of exterminating an insect;
   a tube having a proximal end and a distal free end, wherein the proximal end of the tube is coupled to the housing, wherein the distal free end is disposed away from the housing and wherein the distal free end includes at least one second heating element that is elongated and extends inside the tube away from the distal free end, the at least one second heating element configured to apply heat at a temperature capable of exterminating an insect; and
   a fan disposed inside the housing and coupled to the heating chamber; activating the fan and creating suction inside the tube and through the at least one second heating element;
using the at least one first heating element, generating heat inside the heating chamber;
using the at least one second heating element, generating heat at a temperature capable of exterminating an insect inside the distal free end of the tube;
using the distal free end of the tube, drawing an insect into the tube;
applying heat from the at least one second heating element to the drawn insect inside the tube to initially exterminate the drawn insect; and
applying heat from the at least one first heating element to the initially exterminated insect inside the heating chamber to finally exterminate the insect.

11. The method according to claim 10, wherein the housing further includes a door for removal of the at least one finally exterminated insect from the heating chamber.

12. The method according to claim 10, wherein the housing and the tube are configured to be thermally insulated to prevent loss of heat from the heating chamber and the distal free end.

13. The method according to claim 10, wherein the housing further comprises at least one filter, wherein the at least one filter further comprises a second filter which is disposed between the proximal end of the tube and the fan and/or after the heating chamber.

14. The method according to claim 13, wherein the at least one filter includes at least one third heating element that is configured to apply heat to the at least one initially exterminated insect at the time the at least one initially exterminated insect reaches the at least one filter from the tube when the at least one filter is disposed between the proximal end of the tube and the fan and the at least one filter is configured to apply heat to the at least one finally exterminated insect at the time the at least one finally exterminated insect has been finally exterminated in the heating chamber.

15. The method according to claim 10, wherein the at least one initially exterminated insect includes at least one of the following: a live insect and a dead insect.

16. The method according to claim 15, wherein the at least one finally exterminated insect is a dead insect.

17. The method according to claim 10, wherein the at least one first heating element is configured to heat the heating chamber to a first predetermined temperature.

18. The method according to claim 10, wherein the at least one second heating element is configured to heat the distal free end to a second predetermined temperature.

* * * * *